US008241118B2

(12) United States Patent
Camhi

(10) Patent No.: US 8,241,118 B2
(45) Date of Patent: Aug. 14, 2012

(54) SYSTEM FOR PROMOTING PHYSICAL ACTIVITY EMPLOYING VIRTUAL INTERACTIVE ARENA

(75) Inventor: Keith Camhi, Stamford, CT (US)

(73) Assignee: Great Play Holdings LLC, Greenwood Village, CO (US)

( * ) Notice: Subject to any disclaimer, the term of this patent is extended or adjusted under 35 U.S.C. 154(b) by 945 days.

(21) Appl. No.: 11/342,122

(22) Filed: Jan. 27, 2006

(65) Prior Publication Data

US 2007/0178973 A1 Aug. 2, 2007

(51) Int. Cl.
*A63F 9/24* (2006.01)
*A63F 13/00* (2006.01)
*G06F 17/00* (2006.01)
*G06F 19/00* (2006.01)

(52) U.S. Cl. ............... 463/30; 463/39; 463/40; 463/41; 463/42; 482/54

(58) Field of Classification Search .............. 463/30, 463/39–42; 482/54
See application file for complete search history.

(56) References Cited

U.S. PATENT DOCUMENTS

| 3,091,466 A | 5/1963 | Speiser | 273/184 |
|---|---|---|---|
| 3,508,440 A | 4/1970 | Murphy | 73/379 |
| 3,598,976 A | 8/1971 | Russell | 235/151 |
| 4,086,630 A | 4/1978 | Speiser et al. | 364/410 |
| 4,751,642 A * | 6/1988 | Silva et al. | 473/152 |
| 4,767,121 A | 8/1988 | Tonner | 273/185 |
| 4,915,384 A | 4/1990 | Bear | 273/26 R |
| 5,443,260 A * | 8/1995 | Stewart et al. | 473/451 |
| 5,697,844 A * | 12/1997 | Von Kohorn | 463/40 |
| 5,762,503 A * | 6/1998 | Hoo et al. | 434/237 |
| 5,768,151 A | 6/1998 | Lowy et al. | 364/550 |
| 6,011,485 A * | 1/2000 | Wicks | 340/7.23 |
| 6,039,648 A * | 3/2000 | Guinn et al. | 463/16 |
| 6,302,793 B1 * | 10/2001 | Fertitta et al. | 463/25 |
| 6,476,825 B1 * | 11/2002 | Croy et al. | 715/716 |
| 2002/0045519 A1 * | 4/2002 | Watterson et al. | 482/54 |
| 2002/0107807 A1 * | 8/2002 | Ketonen et al. | 705/51 |

* cited by examiner

*Primary Examiner* — David L Lewis
*Assistant Examiner* — Adetokunbo Torimiro
(74) *Attorney, Agent, or Firm* — St. Onge Steward Johnston & Reens LLC

(57) ABSTRACT

A system for promoting physical activity of a participant includes a plurality of stations. The stations are discrete from one another and each includes a display surface, a station processor, and an input sensor, the input sensor generating sensor signals indicative of interaction of the participant with the station. The station processor generates feedback signals based upon the sensor signals, at least some of the feedback signals being visual signals. Each of the stations also includes a display device displaying visual feedback to the participant, the visual feedback being based upon the visual signals, and being displayed on the display surface. The system also includes a central processor in communication with the station processors, the central processor controlling the stations and coordinating operation of the stations with one another such that the participant interacts with the system using multiple of the stations.

27 Claims, 4 Drawing Sheets

SYSTEM FOR PROMOTING PHYSICAL ACTIVITY EMPLOYING VIRTUAL INTERACTIVE ARENA

FIELD OF THE INVENTION

The present invention relates generally to a system for promoting physical activity, and more specifically to a system that employs multiple synchronized stations to create an immersive virtual interactive arena in which a participant interacts with his/her environment and receives visual feedback.

BACKGROUND OF THE INVENTION

Motor skills and sport skills are learned by frequent repetition of proper technique. Many people have trouble reaching their full physical potential because either they are not taught proper technique (unlearning "wrong" technique is a challenge), or they become bored with the repetition (practice) process that is required to master the technique, sometimes referred to as burning the technique into "muscle memory."

In addition, overall participation in physical activity has been declining among children. This creates a wide range of individual and societal concerns—from obesity to adult-onset diabetes in children. Children are increasingly involved in technology-enabled "screen time"—including watching television and playing computer games. Screen time is often excessive for children because it is so engaging. This contributes to a sedentary lifestyle.

In order to reverse this decline in physical activity within the population, particularly among children, it is desired to provide a system (1) to aid participants in learning and mastering motor skills, and (2) to apply the engaging elements of technology for the positive purpose of promoting physical activity. More specifically, it is desired to promote learning and repetition (and practice) with ongoing, immediate, and engaging feedback.

Various systems have been developed which aim to achieve these goals by providing a simulated sports environment, such as, in particular, by simulating various aspects of baseball (e.g., simulated hitting and pitching systems), golf and other sports.

For example, U.S. Pat. No. 4,767,121, U.S. Pat. No. 4,086,630 and U.S. Pat. No. 3,598,976 disclose golf simulators in which the trajectory of a struck ball is determined by measuring parameters of the ball's impact with a surface. This determined trajectory is then used to calculate and display to a player a virtual representation of where on a virtual golf course his/her shot would have landed. The player can then make another shot from that location, thereby being allowed to play a virtual round of golf. Other types of golf simulators use other means of determining the trajectory of a struck golf ball, such as by employing strategically placed microphones, laser beam based detection means, etc., in order to allow the player to play a virtual round of golf.

Similar systems are also used in other types of sports simulators. For example, U.S. Pat. No. 5,768,151, U.S. Pat. No. 5,433,260 and U.S. Pat. No. 4,915,384 disclose similar systems for use in baseball simulators, while U.S. Pat. No. 4,751,642 discloses a similar system for use in football simulators. In each of these systems, the trajectory of a hit, thrown or kicked ball is determined by one of various sensing means, which determined trajectory is then used to calculate and display to a player a virtual representation of to where on a virtual playing field the ball would have traveled.

Other systems have been developed with the goal of, and/or the result of, promoting physical activity. One rudimentary example of such a "system" is the exercise video, which has been known for decades, and which provides encouragement for a person watching the video on a television to exercise along therewith. More recent examples of such systems include games which require that players dance on a series of pads in response to visual cues (such as the series of games known as Dance Dance Revolution distributed by Konami Corporation), and games which employ tracking cameras (such as the Playstation® Eyetoy™ distributed by Sony Computer Entertainment Inc.).

While each of the above-described systems may promote physical activity to some degree, they suffer from a number of disadvantages. One of the main disadvantages is that all of the prior art systems discussed above disclose the use of only a single play station at which the player is located. As such, while these systems may encourage some physical activity and/or help a player to develop his/her technique, they do not require that the player move around to any significant degree, and therefore do not promote significant locomotive physical activity, and many do not promote physical activity or fitness benefits. Another disadvantage of the prior art systems discussed above is that while such systems may keep track of a player's performance during operation of the system, and may even adjust to the player's experience level, they do not incorporate a player's personal information into the game play. As such, the prior art systems do not make the player feel as though he/she is part of the game, which may cause the player, particularly if the player is a young child, to lose interest in the game. If the systems would make the player feel as though they were immersed in the game, the player, particularly if the player is a young child, may be more "excited" about playing, and therefore, be more likely to play for longer periods of time.

A further disadvantage of the above systems is that they may be used by only one user, or a limited number of users, at any given time, rather than creating an environment for immersing a large group of participants to learn and play together. The latter type of system is more desirable, in that it promotes adherence to a program through social interaction, reduces time waiting in line to perform the activity and maximizes actual active time of participants. Moreover, it allows a few coaches to coach many participants simultaneously.

What is desired, therefore, is a system for promoting physical activity which aids participants in learning and mastering motor skills, which promotes repetition with ongoing, immediate, and engaging feedback, which promotes significant physical activity by requiring participants to move about a relatively large area rather than standing at a single game station, and which immerses the participant in the game, thereby making the participant more likely to continue participating for long periods of time.

SUMMARY OF THE INVENTION

Accordingly, it is an object of the present invention to provide a system for promoting physical activity which aids participants in learning and mastering motor skills.

Another object of the present invention is to provide a system for promoting physical activity having the above characteristics and which promotes repetition with ongoing, immediate, and engaging feedback.

A further object of the present invention is to provide a system for promoting physical activity having the above characteristics and which promotes significant physical activity by requiring participants to move about a relatively large area rather than standing at a single game station.

Still another object of the present invention is to provide a system for promoting physical activity having the above characteristics and which immerses the participant in the game, thereby making the participant more likely to continue participating for long periods of time.

These and other objects are achieved in accordance with one embodiment of the present invention by provision of a system for promoting physical activity of a participant, the system including a plurality of stations. The plurality of stations are discrete from one another and each of the plurality of stations includes a display surface, a station processor, and at least one input sensor in communication with the station processor, the at least one input sensor generating sensor signals indicative of interaction of the participant with the station. The station processor generates feedback signals based at least in part upon the sensor signals received from the at least one input sensor, at least some of the feedback signals comprising visual signals. Each of the plurality of stations also includes a display device displaying visual feedback to the participant, the visual feedback being based at least in part upon the visual signals, and being displayed on the display surface. The system also includes a central processor in communication with the station processors comprising part of each of the plurality of stations, the central processor controlling the plurality of stations and coordinating operation of the plurality of stations with one another such that the participant interacts with the system using multiple of the plurality of stations.

In some embodiments, the at least one input sensor generates sensor signals indicative of interaction of the participant with the display surface. In some embodiments, the system further includes an activities database having stored thereon activities data relating to a plurality of activities in which the participant may engage, the activities database being in communication with the central processor, and the activities data being used by the central processor to control operation of the plurality of stations to allow participants to engage in an activity using multiple of the plurality of stations. In certain of these embodiments, the system further includes a player database having stored thereon player data comprising information relating to the participant using the system, the player database being in communication with the central processor, and the player data being used by the central processor to incorporate information relating to the participant into the game using the plurality of stations in order to create a personalized event experience for the participant. In certain of these embodiments, the player data comprises at least one of the following: name of the participant, age of the participant, birth date of the participant, gender of the participant, physical attributes of the participant, information relating to the participant's family, the hometown of the participant, a photograph of the participant and captured video of the participant. In certain embodiments, the player data comprises at least one of the following: experience level of the participant and past performance of the participant using the system.

In some embodiments, the system further includes a control device in communication with the central processor, the control device being operable by a system administrator to control operation of the system. In certain of these embodiments, the control device comprises a wireless hand-held computing device. In some embodiments, at least some of the feedback signals comprise audio signals, and each of the plurality of stations further includes a speaker playing audio feedback to the participant, the audio feedback being based at least in part upon the audio signals. In some embodiments, the central processor controls at least one of the following within an interactive arena defined by the plurality of stations: lighting, playing of music, playing of ambient noises, visual effects and sound effects.

In some embodiments, the at least one input sensor comprises at least one of the following: side view cameras, rear view cameras, microphones, impact sensors, hoop sensors, goal sensors, optical sensors and vibration sensors. In some embodiments, the central processor is further operable in an individual mode wherein the participant interacts with only one of the plurality of stations at a time. In some embodiments, the system further includes a player camera for capturing images of the participant during interaction of the participant with the system, and the images of the participant are incorporated into the visual feedback. In some embodiments, each of the plurality of stations further includes a feedback database in communication with the station processor, the feedback database having data relating to feedback stored thereon, and the station processor generates the feedback signals based at least in part upon the sensor signals received from the at least one input sensor, and based at least in part upon the feedback data. In some embodiments, the central processor, after the participant has used the system, generates and transmits to the participant an email, the content of which is based at least in part upon the performance of the participant using the system.

In accordance with another embodiment of the present invention, a system for promoting physical activity of a participant includes a plurality of stations, the plurality of stations being discrete from one another. Each of the plurality of stations includes a station processor and at least one input sensor in communication with the station processor, the at least one input sensor generating sensor signals indicative of interaction of the participant with the station. The station processor generates feedback signals based at least in part upon the sensor signals received from the at least one input sensor and provides feedback to the participant based on the feedback signals. The system also includes a central processor in communication with the station processors comprising part of each of the plurality of stations, the central processor controlling the plurality of stations and coordinating operation the plurality of stations with one another such that the participant interacts with the system using multiple of the plurality of stations, an activities database having stored thereon activities data relating to a plurality of activities in which the participant may engage, the activities database being in communication with the central processor, and the activities data being used by the central processor to control operation of the plurality of stations to allow participants to engage in an activity using multiple of the plurality of stations, and a player database having stored thereon player data comprising information relating to the participant using the system, the player database being in communication with the central processor, and the player data being used by the central processor to incorporate information relating to the participant into the game using the plurality of stations in order to create a personalized event experience for the participant.

In some embodiments, the player data comprises at least one of the following: name of the participant, age of the participant, birth date of the participant, gender of the participant, physical attributes of the participant, information relating to the participant's family, the hometown of the participant, a photograph of the participant and captured video of the participant. In some embodiments, the player data comprises at least one of the following: experience level of the participant and past performance of the participant using the system. In some embodiments, the system further includes a control device in communication with the central processor, the control device being operable by a system administrator to control operation of the system. In certain of these embodiments, the control device comprises a wireless hand-held computing device.

In some embodiments, at least some of the feedback signals comprise visual signals, and each of the plurality of stations further includes a display surface and a display device displaying visual feedback to the participant, the visual feedback being based at least in part upon the visual signals, and being displayed on the display surface. In certain of these embodiments, the at least one input sensor generates sensor signals indicative of interaction of the participant with the display surface. In some embodiments, at least some of the feedback signals comprise audio signals, and each of the plurality of stations further includes a speaker playing audio feedback to the participant, the audio feedback being based at least in part upon the audio signals. In some embodiments, the central processor controls at least one of the following within an interactive arena defined by the plurality of stations: lighting, playing of music, playing of ambient noises, visual effects and sound effects.

In some embodiments, the at least one input sensor comprises at least one of the following: side view cameras, rear view cameras, microphones, impact sensors, hoop sensors, goal sensors, optical sensors and vibration sensors. In some embodiments, the central processor is further operable in an individual mode wherein the participant interacts with only one of the plurality of stations at a time. In some embodiments, the system further includes a player camera for capturing images of the participant during interaction of the participant with the system, and the images of the participant are incorporated into the feedback. In some embodiments, each of the plurality of stations further includes a feedback database in communication with the station processor, the feedback database having data relating to feedback stored thereon, and the station processor generates the feedback signals based at least in part upon the sensor signals received from the at least one input sensor, and based at least in part upon the feedback data. In some embodiments, the central processor, after the participant has used the system, generates and transmits to the participant an email, the content of which is based at least in part upon the performance of the participant using the system.

In accordance with another embodiment of the present invention, a system for promoting physical activity of a participant includes a plurality of stations, the plurality of stations being discrete from one another. Each of the plurality of stations includes a display surface, a station processor and a display device displaying visual encouragement to the participant encouraging the participant to engage in physical activity, the visual encouragement being displayed on the display surface. The system also includes a central processor in communication with the station processors comprising part of each of the plurality of stations, the central processor controlling the plurality of stations and coordinating operation of the plurality of stations with one another such that the participant interacts with the system using multiple of the plurality of stations.

The invention and its particular features and advantages will become more apparent from the following detailed description considered with reference to the accompanying drawings.

DETAILED DESCRIPTION OF AN EMBODIMENT OF THE INVENTION

Figure 1:
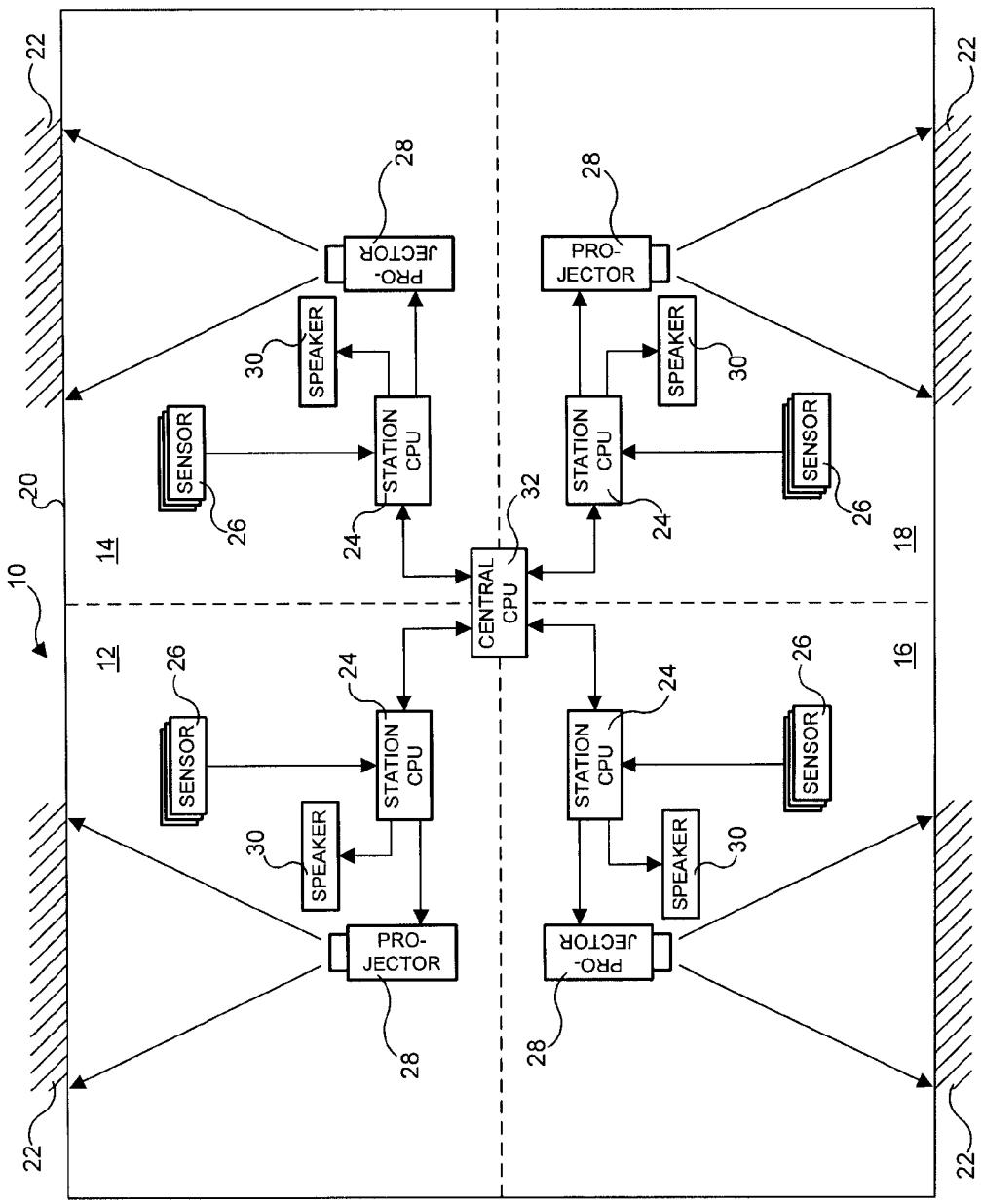
FIG. 1 is a schematic view of a system for promoting physical activity in accordance with an embodiment of the present invention.
Figure 2:
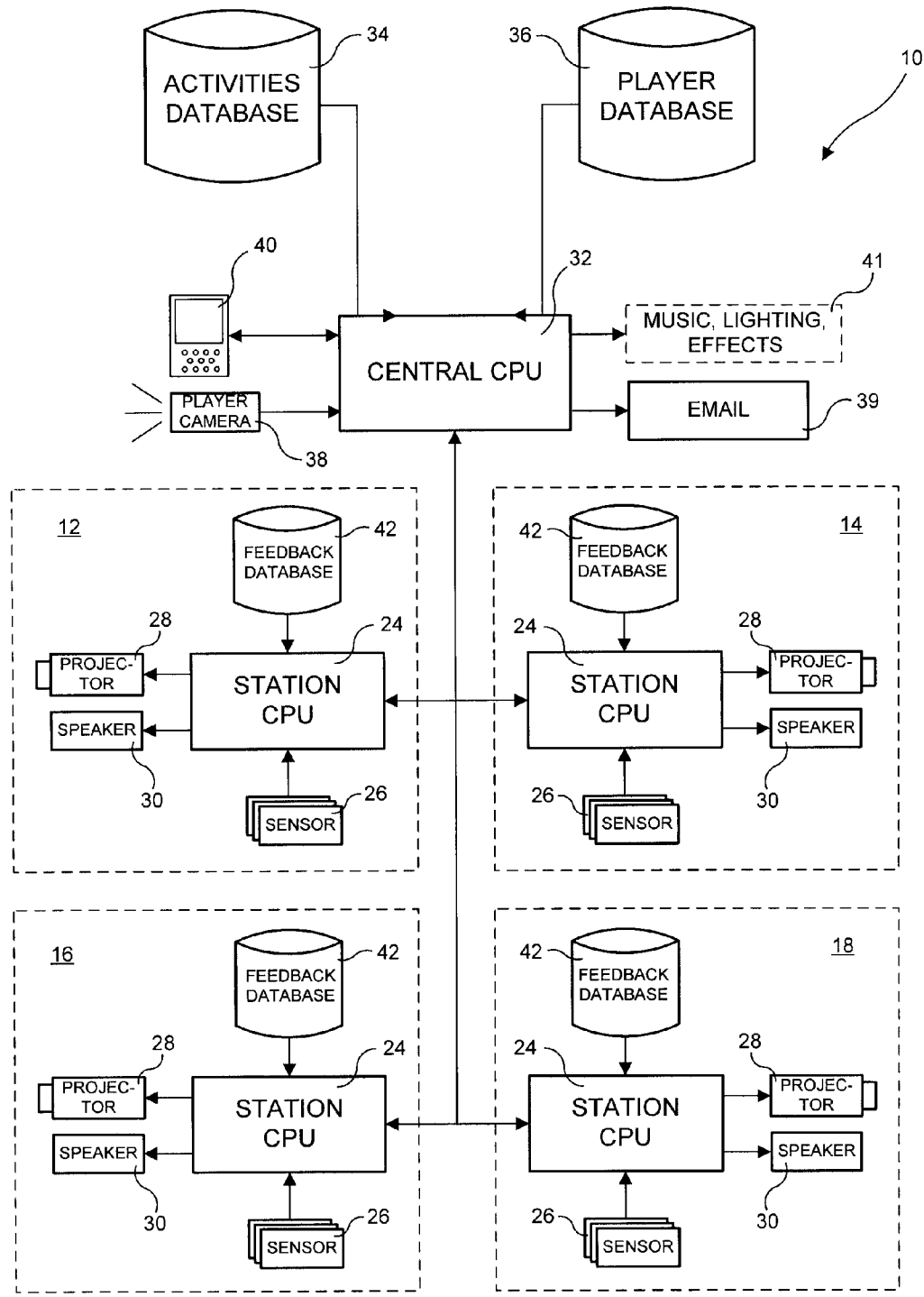
FIG. 2 is a schematic view of the system for promoting physical activity of FIG. 1 shown in more detail.

Referring first to FIGS. 1 and 2, a system 10 for promoting physical activity of a participant in accordance with an embodiment of the present invention is shown. System 10 includes a plurality of stations 12, 14, 16, 18, which together define an interactive arena 20. Each of the stations 12, 14, 16, 18 is discrete from the others of the stations 12, 14, 16, 18, although each of the stations 12, 14, 16, 18 may be in close proximity to or adjacent to (as shown in FIG. 1) the others. Although four stations 12, 14, 16, 18 are shown in FIGS. 1 and 2, it should be understood that fewer than four stations, or more than four stations, may be provided, so long as a plurality (i.e., two or more) stations are provided.

Each station 12, 14, 16, 18 includes a display surface 22, a station processor 24, and at least one input sensor 26 in communication with the station processor 24. It should be noted that some or all of stations 12, 14, 16, 18 may include more than one display surface 22, and that some of stations may not include any input sensor 26. The sensors 26 generate sensor signals indicative of interaction of the participant with the stations 12, 14, 16, 18. The station processors 24 generate feedback signals based at least in part upon the sensor signals received from the input sensors 26. At least some of the feedback signals comprise visual signals and at least some of the feedback signals comprise audio signals. Each of the stations 12, 14, 16, 18 also includes a display device 28 displaying visual feedback to the participant, the visual feedback being based at least in part upon the visual signals, and being displayed on the display surfaces 22. Each of the stations 12, 14, 16, 18 also includes a speaker 30 playing audio feedback to the participant, the audio feedback being based at least in part upon the audio signals. It should be noted that some or all of stations 12, 14, 16, 18 may include more than one display device 28 and/or more than one speaker 30, and that some or all of stations 12, 14, 16, 18 may not include any speaker 30.

In addition to providing feedback, the display device 28 may also be used to generate and display "targets" or other visual cues which encourage the participant, for example, to throw an object toward particular areas of the display surface 22 and/or may be used to provide encouragement for the participant to take certain actions. Similarly, in addition to providing feedback, the speaker 30 may also be used to provide audio cues which encourage the participant, for example, to take certain actions and/or may be used to provide a message which gets the participant "excited" about using the system 10.

The feedback and other cues may comprise any of a number of different types of information having any of a number of different types of formats. For example, the participant may be provided with photographs, drawings, cartoons, etc., or montages thereof, video clips, animations, instructional videos, text, music visualizations (e.g., graphics synchronized to music), etc., which may be displayed on stations 12, 14, 16, 18 individually or may be displayed across multiple of the stations 12, 14, 16, 18 to create a multi-screen effect (e.g., a stadium of people cheering). The information may be adapted to provide instruction to the participant directly (e.g., to demonstrate proper form for a technique), to entertain the participant (e.g., music, entertaining videos), to motivate the participant (e.g., cheering crowds), or the like.

The display device 28 preferably comprises a projector which projects images onto display surface 22. When such is the case, the projector may be of substantially any type, and is preferably able to project streaming video images onto display surface 22. Alternately, however, display device 28 and display surface 22 may be combined, for example, as would be the case where a television or other similar device is employed. Display surface 22 may comprise any of numerous types of materials having any of numerous types of finishes. For example, display surface 22 may comprise a hard surface, such as a wall forming part of the arena 20 itself or a television screen, or display surface 22 may comprise a stretched fabric material, a cushioned material, etc., which may be desirable, for example, to slow an object after impact therewith or to reduce the likelihood of injury if a participant collides with display surface 22. However, when display device 28 takes the form of a projector, display surface 22 is preferably made of a material that is conducive to display of projected images thereon. Station processors 24 may take the form of, for example, personal computers having software running thereon.

System 10 also includes a central processor 32 in communication with station processors 24 comprising part of each of stations 12, 14, 16, 18. Central processor 32 controls stations 12, 14, 16, 18 and coordinates operation of stations 12, 14, 16, 18 with one another such that the participant interacts with system 10 using multiple of stations 12, 14, 16, 18. Thus, for example, suppose a participant is using system 10 to play a game of virtual "tag" that requires the participant to touch an image projected onto display surfaces 22. Using known prior art systems which comprise only a single station, the size of the playing field about which the projected image could "move" would be limited to the size of the display surface of that single station. Thus, even though the participant might be required to move around somewhat in order to touch various portions of the display surface, the participant's level of physical exercise would be relatively limited. On the other hand, using the system 10, which includes multiple discrete stations 12, 14, 16, 18 having multiple display surfaces 22 onto which the image may be projected, which are coordinated by central processor 32, system 10 may force the participant to move from station to station "chasing" the image to be touched around the entire arena 20. Thus, the participant's level of physical exercise is greatly increased.

System 10 further includes an activities database 34 having stored thereon activities data relating to a plurality of activities in which the participant may engage. The activities database 34 is in communication with central processor 32, and the activities data is used by central processor 32 to control operation of stations 12, 14, 16, 18 to allow participants to engage in a variety of activities using multiple of the stations 12, 14, 16, 18, which activities will encourage the participant to become engaged and desire to keep participating. The particular activities may be selected based upon the age, gender, skill level, or any other characteristics of the user. For example, system 10 may be used to play a target game in which a participant throws a ball to hit displayed targets at various locations around arena 20, to play a game of catch with a "virtual partner" who moves around arena 20 and reacts appropriately depending upon where a ball or the like hits the display surfaces 22, to play a dodge-ball type game where the participant attempts to hit a virtual person or object moving around arena 20 attempting to avoid being hit, to play a "move to" game in which the participant must move about the arena 20 following audio instructions (e.g., "run and touch a red square", "skip and touch a blue triangle", "hop and touch a green circle", etc.) and touching various images projected on the display surfaces 22, to play a virtual sports game (e.g., baseball, basketball, etc.) in which the display surfaces 22 have projected thereon a virtual stadium or the like, etc. The options for activities that may be engaged in using system 10 are virtually limitless.

System 10 further includes a player database 36 having stored thereon player data comprising information relating to the participant using the system. Player database 36 is in communication with central processor 32, and the player data is used by central processor 32 to incorporate information relating to the participant into the game being played using stations 12, 14, 16, 18 in order to create a personalized event experience for the participant. For example, the player data may comprise personal information relating to the participant, such as the name of the participant, age of the participant, birth date of the participant, gender of the participant, physical attributes of the participant, information relating to the participant's family, the hometown of the participant, etc. The player data may also comprise things such as a photograph of the participant and/or captured video of the participant.

This type of player data may be used by central processor 32 to generate visual and/or audio specific to the participant to thereby make him/her feel more integrated into the game being played. For example, if a virtual baseball game is being played, the participant's name and other personal information may be announced over speakers 30 and/or his/her personal information and/or photograph may be displayed on display surfaces, similar to the way real baseball players are announced and their personal information displayed on television or display screens at the baseball stadium. The incorporation of participant information into the game being played on system 10 is particularly desirable when the participants are young children, who are often very excited to hear their own names announced and see their own photographs on display and by mimicking professional players and events.

In addition or in the alternative, the player data may comprise information such as the experience level of the participant and/or past performance of the participant using system 10. This type of information may be used by central processor 32 to adjust the difficulty level of the game being played to ensure that the participant is being challenged, while at the same time ensuring that the gameplay is not so difficult that the participant would become discouraged, and report progress to parents.

System 10 may also include a player camera 38 for capturing images of the participant during interaction with system 10. Central processor 32 may incorporate the captured images of the participant into the visual feedback displayed to the participant. For example, if system 10 is used to play a virtual sports game, central processor may use the captured images to show an "instant replay" of the participant after the participant makes a particularly good play, or may record the captured images to track the form of participants over time. Again, such is beneficial because it create a personalized event experience for the participant, and makes the participant feel more immersed in the game.

System 10 preferably also includes a control device 40 in communication with central processor 32, control device 40 being operable by a system administrator to control operation of system 10. For example, control device 40 may be used to select an activity to be engaged in, configure or control various aspects of the activity being engaged in, identify the participant engaging in the activity, etc. At other times, operation of system 10 (e.g., the flow of activities and effects produced) is controlled by central processor 32 (sometimes in conjunction with activities database 34), with control device 40 being able to override control by central processor 32. For example, central processor 32 may control the progression of activities within the arena 20 by timed sequences and/or by putting the arena 20 into different "modes".

Control device 40 may also be operable by the system administrator to set various options and/or themes, such as the type of music to be played, the décor, the mascot(s) to make appearances, etc. Although control device 40 may comprise virtually any type of computing device, it is preferred that control device 40 comprises a wireless hand-held computing device. Preferably, the configuration/option/theme selections can also be made by a participant or someone associated with the participant (such as a parent) when registering to reserve system 10. For example, when system 10 is to be used to host a birthday party or some other event, a parent may reserve use of system 10 prior to the event (either via the Internet or by calling a system administrator, for example), and specify any of the parameters listed above, among others.

In addition to central processor 32 controlling stations 12, 14, 16, 18 and coordinating operation of stations 12, 14, 16, 18 with one another, it is also preferred that central processor 32 be capable of controlling various elements within arena 20 which do not necessarily comprise part of stations 12, 14, 16, 18. For example, central processor 32 may control lighting, playing of music, playing of ambient noises, visual effects and sound effects within arena 20 (as indicated at 41). As such, system to may include various components, such as display devices, speakers, lights, etc., which are associated directly with central processor 32 rather than with station processors 24. The components associated directly with central processor 32 may be used instead of, or in addition to, the components associated with station processors 24 for certain tasks. For example, certain sound effects may be played through the speakers associated with stations processors 24, while other sound effects may be played through the speakers associated with central processor 32. Most preferably, control device 40 may be used to control these various elements through central processor 32.

Central processor 32, after the participant has used system 10, may generate and transmit to the participant an email 39, the content of which is based at least in part upon the performance of the participant using system 10. Email 39, for example, may summarize the activities in which the participant engaged, the participant's performance, etc., may provide "homework" and suggestions for improving the participant's performance, may provide video clips of the participant using system 10, or the like. The purpose of such emails 30 is to further encouraging physical activity, and to encourage the participant to desire to use system 10 again.

While system 10 is primarily intended to be used with stations 12, 14, 16, 18 being operated simultaneously and in a coordinated manner such that the participant interacts with multiple of stations 12, 14, 16, 18 during gameplay, central processor 32 is preferably also operable in an individual mode wherein the participant interacts with only one of the plurality of stations 12, 14, 16, 18 at a time. This allows system 10 to operate in the novel manner described herein, and also, if desired, be operable in a manner similar to the prior art, wherein participants interact only with one station, thereby allowing a plurality of participants to use system 10 independently and simultaneously.

Each of the stations 12, 14, 16, 18 may further include a feedback database 42 in communication with station processor 24, feedback database 42 having data relating to feedback stored thereon. When such a feedback database 42 is provided, station processor 24 generates the feedback signals based at least in part upon the sensor signals received from input sensors 26 and/or based at least in part upon signals received from central processor 32, and based at least in part upon the feedback data. By providing each station 12, 14, 16, 18 with a feedback database 42, the feedback data may be stored locally at each station 12, 14, 16, 18, rather than being stored and processed centrally by central processor 32, and then communicated to stations 12, 14, 16, 18. Thus, central processor 32 may send signals to station processors 24 to play certain feedback at certain times, rather than transmitting all feedback to be played. This allows for stations 12, 14, 16, 18 to be synchronized and coordinated, while at the same time reducing the amount of processing power required by central processor 32 and the required communications bandwidth between central processor 32 station processors 24, thereby reducing the cost and complexity of system 10. This is particularly true of visual feedback, such as streaming video, and where system 10 comprises a large number of stations. For example, if streaming video for eight stations were being processed by central processor 32, central processor 32 would be required to have significant processing power, and the communications network connecting central processor 32 with station processors 24 would have to have high bandwidth.

Input sensors 26 may take many forms, either previously known or newly developed, which sense some aspect of the participant's interaction with stations 12, 14, 16, 18. For example, sensors may sense things such as the position of the participant, the participant hitting, throwing, kicking or somehow otherwise manipulating an object, such as a ball, the participant touching a portion of display surface 22, the participant making a noise, etc. For example, and referring now to FIGS. 3A to 4B, it is often desirable in the types of activities in which may be engaged using system 10 to be able to determine when a participant hits, throws, kicks or otherwise manipulates a ball 52, and to determine the trajectory of ball 52 and/or where and/or how hard ball 52 strikes a surface, such as display surface 22. There are many types of sensors that can be used in order to accomplish this.

Figure 3B:
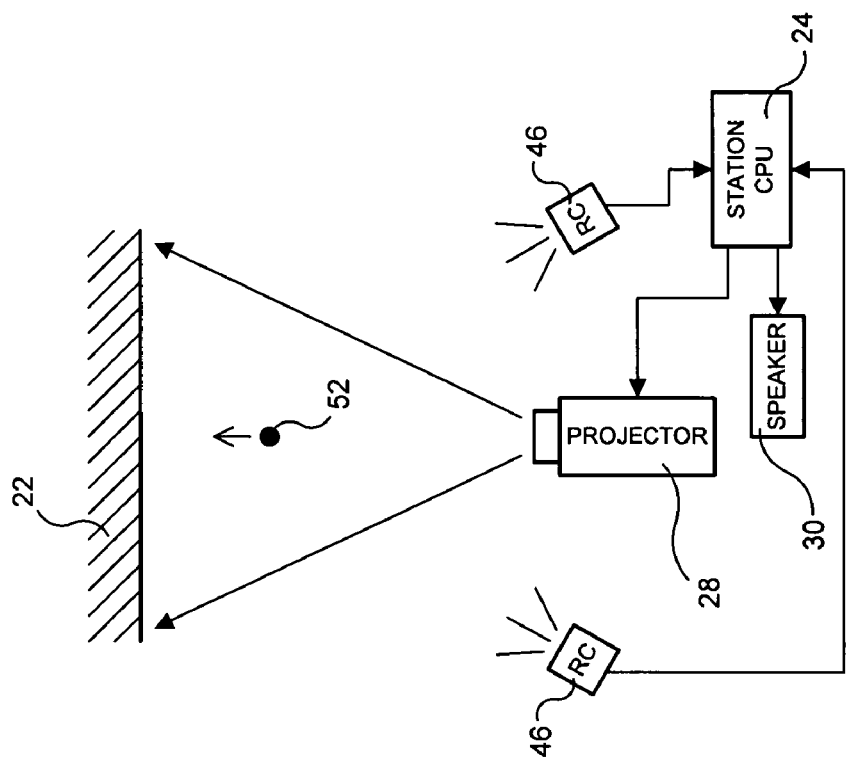
FIGS. 3A and 3B are schematic views of a station of the system for promoting physical activity of FIG. 1 employing cameras as the object position sensors.
Figure 3A:
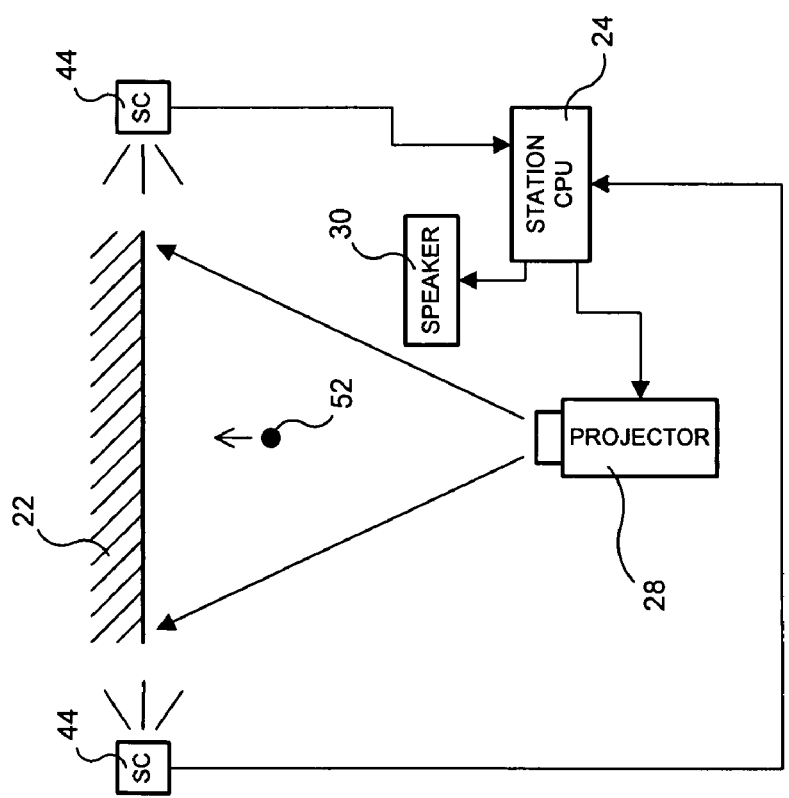
Figures 4A, 4B:
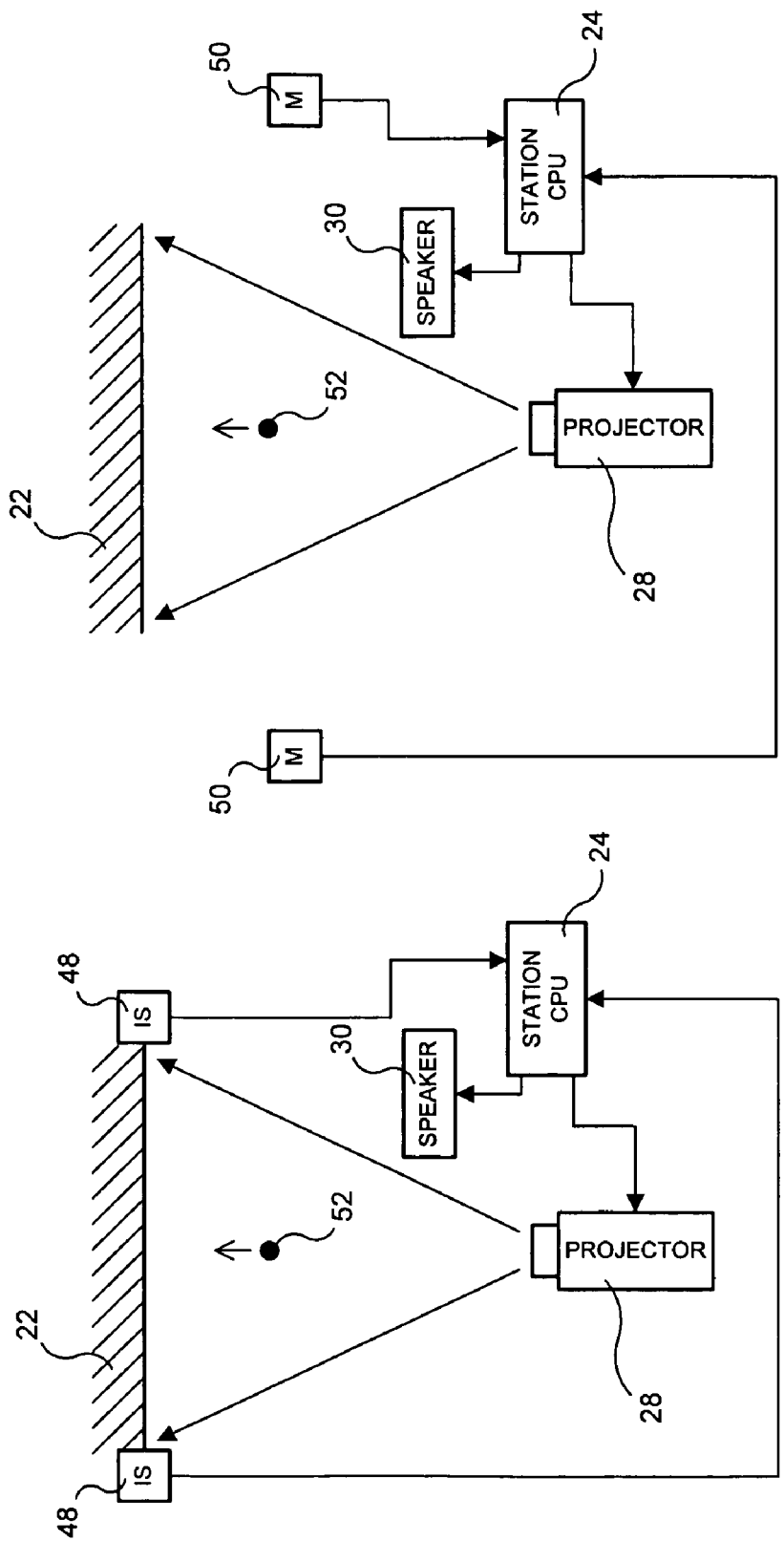
FIGS. 4A and 4B are schematic views of a station of the system for promoting physical activity of FIG. 1 employing alternative types of object position sensors.

In FIGS. 3A and 3B sensors 26 are shown as cameras which can be used to capture images of the ball 52, in flight and/or as it strikes display surface 22. The cameras may be side view cameras 44 (as shown in FIG. 3A), rear view cameras 46 (as shown in FIG. 3B) or any combination thereof. In FIGS. 4A and 4B, alternative types of sensors 26 are shown, including impact sensors 48, many types of which are known, which sense when, where and/or how hard ball 52 strikes display surface 22, and microphones 50, which may detect when ball 52 is struck and/or when ball 52 strikes display surface 22. Other types of sensors may also be employed, such as optical sensors, vibration sensors, RFID sensors, hoop sensors associated with a basketball hoop, a "tire" through which a football is intended to be thrown, or other type of sports-related apparatus, or goal sensors associated with a soccer goal, a hockey goal, or other type of sports-related goal.

Station processors 24 may use the information gathered by sensors 26 to determine the trajectory of ball 52 and/or where and/or how hard ball 52 strikes display surface 22 in a variety of ways. Many known techniques for accomplishing this are described in the prior art, including the prior art described above, and several new and novel techniques for accomplishing this are described in a related patent application entitled "System For Promoting Physical Activity Employing Impact Position Sensing And Response", which is being filed on the same day as the current application by the inventor of the current application, and which application is hereby incorporated by reference herein in its entirety. Since such techniques are well-known in the prior art, or described in detail in the inventor's other application, they are not described in detail herein.

The present invention, therefore, provides a system for promoting physical activity which aids participants in learning and mastering motor skills, which promotes repetition with ongoing, immediate, and engaging feedback, which promotes significant physical activity by requiring participants to move about a relatively large area rather than standing at a single game station, and which immerses the participant in the game, thereby making the participant more likely to continue participating for long periods of time.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for promoting physical activity of a participant, said system comprising:
   a plurality of stations, said plurality of stations being discrete from one another and being separately playable but being located adjacent to one another so as to collectively define an arena, such that the participant is able to freely move about the arena from one of said plurality of stations to another, as well as being physically present within multiple of said plurality of stations simultaneously, and each of said plurality of stations comprising:
   a display surface;
   a station processor;
   at least one input sensor in communication with said station processor, said at least one input sensor generating sensor signals indicative of interaction of the participant with the station;
   a feedback database in communication with said station processor, the feedback database having data relating to feedback stored thereon;
   wherein said station processor generates feedback signals based at least in part upon the sensor signals received from the at least one input sensor and based at least in part upon the feedback data, at least some of the feedback signals comprising visual signals; and
   a display device displaying visual feedback to the participant, the visual feedback being based at least in part upon the visual signals, and being displayed on said display surface; and
   a central processor in communication with said station processors comprising part of each of said plurality of stations, said central processor being operable in a cooperative mode in which said central processor controls said plurality of stations and coordinates operation of said plurality of stations with one another such that the participant interacts with said system using, and is physically present within, multiple of said plurality of stations simultaneously, and said central processor being further operable in an individual mode wherein the participant interacts with only one of said plurality of stations at a time.

2. The system of claim 1 wherein said at least one input sensor generates sensor signals indicative of interaction of the participant with said display surface.

3. The system of claim 1 further comprising an activities database having stored thereon activities data relating to a plurality of activities in which the participant may engage, said activities database being in communication with said central processor, and the activities data being used by said central processor to control operation of said plurality of stations to allow participants to engage in an activity using multiple of said plurality of stations.

4. The system of claim 3 further comprising a player database having stored thereon player data comprising information relating to the participant using said system, said player database being in communication with said central processor, and said player data being used by said central processor to incorporate information relating to the participant into the game using said plurality of stations in order to create a personalized event experience for the participant.

5. The system of claim 4 wherein the player data comprises at least one of the following: name of the participant, age of the participant, birth date of the participant, gender of the participant, physical attributes of the participant, information relating to the participant's family, the hometown of the participant, a photograph of the participant and captured video of the participant.

6. The system of claim 4 wherein the player data comprises at least one of the following: experience level of the participant and past performance of the participant using said system.

7. The system of claim 1 further comprising a control device in communication with said central processor, said control device being operable by a system administrator to control operation of said system.

8. The system of claim 7 wherein the control device comprises a wireless hand-held computing device.

9. The system of claim 1 wherein at least some of the feedback signals comprise audio signals, and wherein each of said plurality of stations further comprises a speaker playing audio feedback to the participant, the audio feedback being based at least in part upon the audio signals.

10. The system of claim 1 wherein said central processor controls at least one of the following within an interactive arena defined by said plurality of stations: lighting, playing of music, playing of ambient noises, visual effects and sound effects.

11. The system of claim 1 wherein said at least one input sensor comprises at least one of the following: side view cameras, rear view cameras, microphones, impact sensors, hoop sensors, goal sensors, optical sensors and vibration sensors.

12. The system of claim 1 further comprising a player camera for capturing images of the participant during interaction of the participant with said system, and wherein the images of the participant are incorporated into the visual feedback.

13. The system of claim 1 wherein said central processor, after the participant has used said system, generates and transmits to the participant an email, the content of which is based at least in part upon the performance of the participant using said system.

14. A system for promoting physical activity of a participant, said system comprising:
   a plurality of stations, said plurality of stations being discrete from one another and being separately playable, but being located adjacent to one another so as to collectively define an arena, such that the participant is able to freely move about the arena from one of said plurality of stations to another, as well as being physically present within multiple of said plurality of stations simultaneously, and each of said plurality of stations comprising a station processor, at least one input sensor in communication with the station processor, the at least one input sensor generating sensor signals indicative of interaction of the participant with the station, a feedback database in communication with the station processor, the feedback database having data relating to feedback stored thereon and wherein the station processor generates feedback signals based at least in part upon the sensor signals received from the at least one input sensor and based at least in part upon the feedback data, and provides feedback to the participant based on the feedback signals;

a central processor in communication with the station processors comprising part of each of said plurality of stations, said central processor being operable in a cooperative mode in which said central processor controls said plurality of stations and coordinates operation of said plurality of stations with one another such that the participant interacts with said system using, and is physically present within, multiple of said plurality of stations simultaneously, and said central processor being further operable in an individual mode wherein the participant interacts with only one of said plurality of stations at a time;

an activities database having stored thereon activities data relating to a plurality of activities in which the participant may engage, said activities database being in communication with said central processor, and the activities data being used by said central processor to control operation of said plurality of stations to allow participants to engage in an activity using multiple of said plurality of stations; and a player database having stored thereon player data comprising information relating to the participant using said system, said player database being in communication with said central processor, and said player data being used by said central processor to incorporate information relating to the participant into the game using said plurality of stations in order to create a personalized event experience for the participant.

15. The system of claim 14 wherein the player data comprises at least one of the following: name of the participant, age of the participant, birth date of the participant, gender of the participant, physical attributes of the participant, information relating to the participant's family, the hometown of the participant, a photograph of the participant and captured video of the participant.

16. The system of claim 14 wherein the player data comprises at least one of the following: experience level of the participant and past performance of the participant using said system.

17. The system of claim 14 further comprising a control device in communication with said central processor, said control device being operable by a system administrator to control operation of said system.

18. The system of claim 17 wherein the control device comprises a wireless hand-held computing device.

19. The system of claim 14 wherein at least some of the feedback signals comprise visual signals, and wherein each of said plurality of stations further comprises a display surface and a display device displaying visual feedback to the participant, the visual feedback being based at least in part upon the visual signals, and being displayed on the display surface.

20. The system of claim 19 wherein the at least one input sensor generates sensor signals indicative of interaction of the participant with the display surface.

21. The system of claim 14 wherein at least some of the feedback signals comprise audio signals, and wherein each of said plurality of stations further comprises a speaker playing audio feedback to the participant, the audio feedback being based at least in part upon the audio signals.

22. The system of claim 14 wherein said central processor controls at least one of the following within an interactive arena defined by said plurality of stations: lighting, playing of music, playing of ambient noises, visual effects and sound effects.

23. The system of claim 14 wherein said at least one input sensor comprises at least one of the following: side view cameras, rear view cameras, microphones, impact sensors, hoop sensors, goal sensors, optical sensors and vibration sensors.

24. The system of claim 14 further comprising a player camera for capturing images of the participant during interaction of the participant with said system, and wherein the images of the participant are incorporated into the feedback.

25. The system of claim 14 wherein said central processor, after the participant has used said system, generates and transmits to the participant an email, the content of which is based at least in part upon the performance of the participant using said system.

26. A system for promoting physical activity of a participant, said system comprising:

a plurality of stations, said plurality of stations being discrete from one another and being separately playable, but being located adjacent to one another so as to collectively define an arena, such that the participant is able to freely move about the arena from one of said plurality of stations to another, as well as being physically present within multiple of said plurality of stations simultaneously, and each of said plurality of stations comprising:

a display surface;

a station processor; and a display device displaying visual encouragement to the participant encouraging the participant to engage in physical activity, the visual encouragement being displayed on said display surface; and a central processor in communication with said station processors comprising part of each of said plurality of stations, said central processor being operable in a cooperative mode in which said central processor controls said plurality of stations and coordinates operation of said plurality of stations with one another such that the participant interacts with said system using, and is physically present within, multiple of said plurality of stations simultaneously, and said central processor being further operable in an individual mode wherein the participant interacts with only one of said plurality of stations at a time.

27. The system of claim 26 wherein said central processor, after the participant has used said system, generates and transmits to the participant an email, the content of which is based at least in part upon the performance of the participant using said system.

* * * * *